United States Patent Office 2,766,213
Patented Oct. 9, 1956

2,766,213

PROCESS FOR BREAKING PETROLEUM EMULSIONS

Woodrow J. Dickson, Monterey Park, Calif., assignor to Petrolite Corporation, Wilmington, Del., a corporation of Delaware No Drawing. Application January 26, 1953,
Serial No. 333,330

16 Claims. (Cl. 252—342)

This invention is concerned with processes for preventing, breaking, or resolving emulsions of the water-in-oil type, and particularly petroleum emulsions, in which certain new chemical compositions are employed.

Said compositions are acidic fractional esters containing free carboxyl groups. They are produced from polycarboxy acids and certain hydrophile polyhydric synthetic products. The latter are, in turn, certain oxyalkylated phenol-aldehyde resins.

For convenience, the following subject-matter is divided into four parts, as follows:

Part 1, concerned with the preparation of the parent phenol-aldehyde resins.

Part 2, concerned with the oxyalkylation of such resins.

Part 3, concerned with the preparation of acidic fractional esters from polycarboxy acids and the oxyalkylation products just mentioned.

Part 4, concerned with the resolution of petroleum emulsions of the water-in-oil type by means of the previously described esters.

PART 1.—PARENT RESINS

The parent phenol-aldehyde resins, from which my compositions are produced, are well-known. For example, see U. S. Patent No. 2,499,370, to DeGroote & Keiser, dated March 7, 1950, in which patent such resins are described in detail and in which patent 103 (a)-series examples are recited, showing preparation of such parent resins. Although the highest phenol used in said patent examples is a C-12 phenol, it should be noted that the preparation of similar resins from C-14 phenols is accomplished exactly as there recited with respect to C-12 phenols, e. g., in Examples 73a, 99a, and 101a of said patent. I incorporate into the present application by reference the description of such resins contained in said patent and all said 103 (a)-series examples of said patent, instead of describing such resins in detail and repeating such examples individually here. All such resins are suitable parent materials for the present purpose.

In Table I below I have set down a total of 40 resins which are representative of the resins suitable for producing my compositions. This list is illustrative only, and is obviously not exclusive. In the table headings, R represents the hydrocarbon substituent in the phenolic ring; R''' represents the bridging radical, arising in the respective aldehydes employed; and $n$ represents the number of phenolic units present in the resin, exclusive of the end units, and on a statistical basis. The molecular weights shown are calculated from $n$ and the molecular weights of the starting raw materials used in each case. In other words, the resins may broadly be represented as follows:

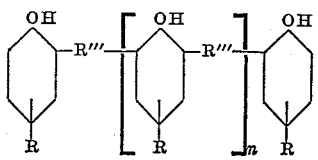

TABLE I

| Example Number | R | Position of R | R''' derived from— | $n$ | Mol. Wt. of Resin Molecule (based on $n+2$) |
|---|---|---|---|---|---|
| 1a | phenyl | para | formaldehyde | 3.5 | 992.5 |
| 2a | tertiary butyl | do | do | 3.5 | 882.5 |
| 3a | secondary butyl | ortho | do | 3.5 | 882.5 |
| 4a | cyclohexyl | para | do | 3.5 | 1025.5 |
| 5a | tertiary amyl | do | do | 3.5 | 959.5 |
| 6a | mixed secondary and tertiary amyl | ortho | do | 3.5 | 805.5 |
| 7a | propyl | para | do | 3.5 | 805.5 |
| 8a | tertiary hexyl | do | do | 3.5 | 1036.5 |
| 9a | octyl | do | do | 3.5 | 1190.5 |
| 10a | nonyl | do | do | 3.5 | 1267.5 |
| 11a | decyl | do | do | 3.5 | 1344.5 |
| 12a | dodecyl | do | do | 3.5 | 1498.5 |
| 13a | tertiary butyl | do | acetaldehyde | 3.5 | 945.5 |
| 14a | tertiary amyl | do | do | 3.5 | 1022.5 |
| 15a | nonyl | do | do | 3.5 | 1330.5 |
| 16a | tertiary butyl | do | butyraldehyde | 3.5 | 1071.5 |
| 17a | tertiary amyl | do | do | 3.5 | 1148.5 |
| 18a | nonyl | do | do | 3.5 | 1456.5 |
| 19a | tertiary butyl | do | propionaldehyde | 3.5 | 1008.5 |
| 20a | tertiary amyl | do | do | 3.5 | 1085.5 |
| 21a | nonyl | do | do | 3.5 | 1393.5 |
| 22a | tertiary butyl | do | formaldehyde | 4.2 | 996.6 |
| 23a | tertiary amyl | do | do | 4.2 | 1083.4 |
| 24a | nonyl | do | do | 4.2 | 1430.6 |
| 25a | tertiary butyl | do | do | 4.8 | 1094.4 |
| 26a | tertiary amyl | do | do | 4.8 | 1189.6 |
| 27a | nonyl | do | do | 4.8 | 1570.4 |
| 28a | tertiary amyl | do | do | 1.5 | 604.0 |
| 29a | cyclohexyl | do | do | 1.5 | 646.0 |
| 30a | hexyl | do | do | 1.5 | 653.0 |
| 31a | do | do | acetaldehyde | 1.5 | 688.0 |
| 32a | octyl | do | do | 1.5 | 786.0 |
| 33a | nonyl | do | do | 1.5 | 835.0 |
| 34a | octyl | do | butyraldehyde | 2.0 | 986.0 |
| 35a | nonyl | do | do | 2.0 | 1028.0 |
| 36a | amyl | do | do | 2.0 | 860.0 |
| 37a | butyl | do | formaldehyde | 2.0 | 636.0 |
| 38a | amyl | do | do | 2.0 | 692.0 |
| 39a | hexyl | do | do | 2.0 | 748.0 |
| 40a | cyclohexyl | do | do | 2.0 | 740.0 |

PART 2.—OXYALKYLATED RESIN REACTANTS

The alkylene oxides employed to react with my parent resins to produce my compositions are limited to ethylene oxide, propylene oxide, butylene oxide, glycid and methylglycid. Their characteristics, as well as those of the substituted phenols and the aldehydes used by me to produce the resins, are described in the patents to which reference has been made above, and need not be detailed here.

Above-mentioned U. S. Patent No. 2,499,370 recites in detail, with examples, the procedure used to produce oxyalkylated derivatives of the resins described in Part 1 above, by reacting such resins with an oxyalkylating agent of the present class. Reference is therefore made to said patent in regard to such description. The (b)-series examples of said patent show specific details of the general oxyalkylation procedure as applied to the present class of resins. Those (b)-series examples, however, all show the introduction of less alkylene oxide, and specifically less propylene oxide, than is employed to produce the presently-claimed compositions. Nevertheless, the present level of oxyalkylation is accomplished by simply continuing the oxyalkylation process as described in said patent.

U. S. Patent No. 2,605,230, to DeGroote, dated July 29, 1952, contains an especially comprehensive statement of oxypropylation, in its Part 1. Said Part 1 of said patent, from its beginning down to its Example 1a, is therefore incorporated herein, by reference, further to illustrate oxyalkylation procedure.

With respect to the hazards attendant on the use of glycid in oxyalkylation, attention is called to the statement appearing in U. S. Patent No. 2,602,062, to DeGroote, dated July 1, 1952, at column 4, line 50, through column 5, line 20 thereof. Said passage is likewise incorporated herein, by reference.

Oxyalkylation of the resins of Part 1 above is so conventional a procedure that it is necessary only to mention a few points concerning it. It is preferable to oxyalkylate the resins in the presence of sufficient inert solvent to produce a solution of low viscosity at oxyalkylation temperatures. Xylene is a suitable solvent of this kind.

Before oxyalkylating the resin, it is very desirable to remove as completely as possible any water present in the resin or resin solution, e. g., the water introduced with the oxyalkylation catalyst when the latter is added in dissolved form, such as sodium hydroxide solution. Such water removal may be accomplished by heating the resin mass until the water has volatilized.

As an example of suitable oxyalkylation procedure, the following may be given.

Example 1b

Charge into an autoclave 177 parts by weight of a conventional para-amylphenol-formaldehyde resin, such as that of Example 3a of U. S. Patent No. 2,499,370, or of Example 5a of Table I above. Add 177 parts by weight of xylene and 5 parts by weight of sodium hydroxide. The latter is added as a 50% aqueous solution. The autoclave is then heated, with stirring, and with the charge hole open, until the water has been evaporated, and the resin solution contains only a few tenths of a percent of water, at most. It is then sealed and swept with nitrogen; and propylene oxide is then introduced at a temperature of about 125–130° C., as rapidly as the resin will accept it without forcing the pressure above about 50 p. s. i. g. A total of 2,320 parts by weight (40 mols per phenolic nucleus) of propylene oxide is so introduced.

As the desired level of oxypropylation rises, acceptance of the propylene oxide is slowed. It may be necessary to increase the reaction temperature and pressure somewhat, or increase catalyst amount, to accomplish the introduction of the final portion of the oxide, if time is limited.

The reactant amounts recited in the foregoing example and the following examples are expressed as "parts," for the reason that I have worked with quantities ranging from grams to thousands of pounds, in conducting these operations. Similarly, I have used autoclaves ranging from about 1-gallon capacity up to about 1,500-gallon capacity.

In some instances, I have found it desirable to start the oxyalkylation in a small autoclave, e. g., of 5-, 15-, or 25-gallon capacity, and thereafter transfer the partially oxyalkylated material to a larger autoclave to conclude the processing. Such technique facilitates processing, in many instances, because it is more desirable to work with a liquid volume that more nearly fills the vessel than to have a relatively small liquid volume that occupies only a small portion of the capacity. The proportion of alkylene oxide is so great that there is a large increase in volume, from the volume of resin reactant originally present, as oxyalkylation proceeds.

Example 2b

I have proceeded exactly as in Example 1b above, except that I introduced a total of 3,480 parts by weight of propylene oxide (60 mols per phenolic nucleus).

Example 3b

I have proceeded exactly as in Example 1b above, except that I introduced a total of 4,640 parts by weight of propylene oxide (80 mols per phenolic nucleus).

Example 4b

I have proceeded exactly as in Example 1b above, except that I introduced a total of 5,800 parts by weight of propylene oxide (100 mols per phenolic nucleus).

Example 5b

I have proceeded exactly as in Example 1b above, except that I introduced a total of 6,960 parts by weight a propylene oxide (120 mols per phenolic nucleus).

Example 6b

I have proceeded exactly as in Examples 1b to 5b inclusive, except that I have started with 163 parts by weight of a conventional butylphenol-formaldehyde resin, such as that of Example 1a of U. S. Patent No. 2,499,370 or of Example 3a of Table I above, instead of using 177 parts by weight of the amylphenol-formaldehyde resin used in those examples.

Example 7b

I have proceeded exactly as in Examples 1b to 5b inclusive, except that I have started with 219 parts by weight of a conventional octylphenol-formaldehyde resin, such as that of Example 8a of U. S. Patent No. 2,499,370 or of Example 9a of Table I above, instead of using 177 parts by weight of the amylphenol-formaldehyde resin used in those examples.

Example 8b

I have proceeded exactly as in Examples 1b to 5b inclusive, except that I have started with 233 parts by weight of a conventional nonylphenol-formaldehyde resin, such as that of Example 70a of U. S. Patent No. 2,499,370, or of Example 10a of Table I above, instead of using 177 parts by weight of the amylphenol-formaldehyde resin used in those examples.

Example 9b

I have proceeded exactly as in Examples 1b to 5b inclusive, except that I have started with 303 parts by weight of a conventional tetradecylphenol-formaldehyde resin, similar to the dodecylphenol-formaldehyde resin of Example 73a of U. S. Patent No. 2,499,370 or of Example 12a of Table I above, instead of using 177 parts by weight of the amylphenol-formaldehyde resin used in those examples.

Instead of using the formaldehyde resins of Examples 1b to 9b above, one may of course use the acetaldehyde-, propionaldehyde-, butyraldehyde-, heptaldehyde- or other aldehyde-resins, for example, those of Examples 14a, 24a, 25a, 26a, 34a, 35a, 36a, 76a, 78a, 82a, of U. S. Patent No. 2,499,370 or of those examples from Table I above which relate to resins prepared from such aldehydes. Suitable resin reactant amounts may be calculated in such cases, based on the molecular weights of the phenol and the aldehyde used to produce the resin. The molecular equivalent of the resin unit is the sum of the molecular weights of the phenol and the aldehyde, minus one mol of water. For instance, as to amylphenol-formaldehyde resin, this figure is 177, as used in Example 1b above.

In addition to containing a minimum of 40 mols of oxypropylene radicals per phenolic nucleus, the oxyalkylated resins may desirably contain radicals derived from one or more of my other alkylene oxides, ethylene oxide, butylene oxide, glycid, and methylglycid, and introduced by a prior or subsequent oxyalkylation procedure. It is my preference to include in the oxyalkylated resin a minor proportion of oxyethylene radicals, introduced by oxyethylation using ethylene oxide. The oxyethylene radicals are preferably introduced after oxypropylation has been accomplished.

The following examples illustrate this point.

Example 10b

After preparing the oxypropylated resin of Example 1b, the propylene oxide feed is shut off, the ethylene oxide feed is started, and oxyalkylation is continued without interruption, in the same autoclave. A total of 220 parts by weight of ethylene oxide (5 mols per phenolic nucleus) is so introduced into said oxypropylated product of Example 1b.

Example 11b

I have prepared the oxypropylated product of Example 2b above, and have thereafter introduced 440 parts by weight of ethylene oxide (10 mols per phenolic nucleus), proceeding exactly as in Example 10b above.

Example 12b

I have prepared the oxypropylated product of Example 3b above, and have thereafter introduced 660 parts by weight of ethylene oxide (15 mols per phenolic nucleus), proceeding exactly as in Example 10b above.

Example 13b

I have prepared the oxypropylated product of Example 4b above, and have thereafter introduced 770 parts by weight of ethylene oxide (17.5 mols per phenolic nucleus), proceeding exactly as in Example 10b above.

Example 14b

I have prepared the oxypropylated product of Example 5b above, and have thereafter introduced 880 parts by weight of ethylene oxide (20 mols per phenolic nucleus), proceeding exactly as in Example 10b above.

Example 15b

I have prepared oxypropylated resins, using the resin reactants of Examples 6b to 9b inclusive, and introducing into such resins, respectively, 40, 60, 80, 100, and 120 mols of propylene oxide, respectively, per phenolic nucleus. I have thereafter introduced into such oxypropylated resins, respectively, 5, 10, 15, 17.5, and 20 mols of ethylene oxide per phenolic nucleus, respectively.

As stated above, the proportions of reactants recited in the foregoing examples have been expressed as "parts," because I have employed quantities ranging from grams up to hundreds or thousands of pounds, proceeding as recited in said examples, to produce my oxyalkylated reactants.

I do not employ less than 40 mols or more than about 120 mols of propylene oxide per phenolic nucleus, to produce my oxyalkylated intermediates. I prefer to incorporate into such intermediates additionally from 5 to 20 mols of ethylene oxide, per phenolic nucleus. I state further that I do not in any instance incorporate into my resin reactants a total of more than about 150 mols of all members of my class of alkylene oxides, per phenolic nucleus.

Even more than 20 mols of ethylene oxide is sometimes desirably introduced per phenolic nucleus.

To rephrase: Introduction of a plurality of radicals of a second alkylene oxide of the class recited is usually to be desired; but such second alkylene oxide is not required to be employed in all instances. Where such second oxide is used, I prefer to use ethylene oxide, and to do so subsequent to the introduction of the oxypropylene radicals.

While a minimum of 40 oxypropylene radicals per phenolic nucleus is required to make the oxyalkylated resin reactant suitable for esterification to produce my ester compositions, I greatly prefer that my oxyalkylated resin reactant contain at least 80 such oxypropylene radicals per phenolic nucleus. I further prefer that both oxyethylene and oxypropylene radicals be present in my oxyalkylated resin reactants, and that, where at least 80 oxypropylene radicals occur per phenolic nucleus, approximately 15 oxyethylene radicals be subsequently introduced into the oxypropylated resin. When more than about 120 oxypropylene radicals and about 20 oxyethylene radicals occur per phenolic nucleus, the oxyalkylated resin reactants appear to produce somewhat less effective ester compositions.

Where one or more of my other alkylene oxides are introduced into the resin, in addition to propylene oxide, portions of the several alkylene oxides used may be introduced alternately until addition is complete. For example, one may introduce 5 mols of ethylene oxide, then 30 mols of propylene oxide, then 5 mols of ethylene oxide, then 30 more mols of propylene oxide, and finally 5 more mols of ethylene oxide, for a total of 60 mols propylene oxide and 15 mols ethylene oxide.

In general, I prefer that the larger portion of the propylene oxide be introduced first, or at least early in the oxyalkylation operation. In other words, the oxyalkylene radicals supplied by such other alkylene oxide or oxides are usually and preferably more distant from the phenolic nucleus than are the oxypropylene radicals.

As an especially desirable oxyalkylated resin reactant, I will name that produced by oxypropylating a conventional amylphenol-formaldehyde resin, using 88 mols of propylene oxide for each phenolic nucleus. When one follows said oxypropylation step with an oxyethylation step in which 15 mols of ethylene oxide are introduced for each phenolic nucleus, a composition is produced which is even more especially desirable for use in the subsequent esterification procedure.

The oxyalkylated resins have greater or lesser water dispersibility, depending on the level and kind of oxyalkylation. They are all hydrophile, in the sense that they meet the test for hydrophile properties recited in U. S. Patent No. 2,499,370, to DeGroote & Keiser, dated March 7, 1950. (See column 40, line 21, through column 43, line 5 thereof.) In summary, this is to say that, when the oxyalkylated resin is mixed with an equal volume of xylene and such xylene solution is shaken vigorously with from one to three volumes of water, the hydrophile properties of said oxyalkylated resin are sufficient to produce an emulsion.

PART 3.—ESTERS

My finished products are esters characterized by the presence of free carboxyl groups. They are employed by me in this form and without further chemical processing or treatment.

To prepare my ester compositions, one may use tricarboxy acids such as citric or tricarballylic; but it is my preference to use a dicarboxy acid or anhydride, like oxalic acid, maleic acid or anhydride, tartaric acid, citraconic acid, phthalic acid or anhydride, adipic acid, succinic acid, azelaic acid, sebacic acid, diglycolic acid, adduct acids of the diene or Clocker type (see Clocker, U. S. Patents Nos. 2,188,882–90), and especially such adduct acids having 8 carbon atoms or less. Polycarboxy acids having more than 8 carbon atoms may be used, such as dimerized abietic acid, dimerized fatty acids obtained from diene acids and their esters, adduct acids obtained from terpenes and either maleic or citraconic acid or their anhydrides. One may also use adduct acids of the type prepared by reaction between maleic anhydride, citraconic anhydride, or diglycolic acid, and butadiene or cyclopentadiene. Oxalic acid tends to decompose and is not quite as satisfactory as some of the other acids in the same price range, which are both cheap and heat-resistant. Halogenated polycarboxy acids which retain the polycarboxy function are usable reactants here.

My other reactant is an oxyalkylated resin of the kind described in Part 2 above. As stated there, not every oxyalkylated derivative of any phenol-aldehyde resin is suitable as such reactant. The small sub-class of resins which are suitable parent materials contain phenolic residues derived from difunctional phenols whose hydrocarbon substituents have from 4 to 14 carbon atoms; and within this group of phenols, I definitely prefer those having from 4 to 9 carbon atoms in the side chain. While my oxyalkylated resin reactants are required to contain a minimum of 40 occurrences of the oxypropylene radical for each phenolic nucleus present, I find the most desirable ones contain of the order of 80 to 120 occurrences of said oxypropylene radical, per phenolic nucleus. Furthermore, the most desirable reactants of this class contain, in addition to such 80–120 oxypropylene radicals, a minor number of other oxyalkylene radicals, preferably oxyethylene radicals. Finally, in my most desirable oxyalkylated resin reactants, containing a plurality of oxypropylene radicals and a plurality of at least one other and different oxyalkylene radical, the oxypropylene radicals have been introduced first, and the oxyalkylene radicals derived from the other alkylene oxide or oxides have been introduced thereafter.

The production of esters, including acidic fractional esters, from polycarboxy acids and hydroxylated compounds is well-known. Various acidic reactants may be employed, such as the low-molal esters, the anhydrides, the acyl chlorides, etc. I prefer to use the free polycarboxy acids or their anhydrides. I prefer to employ polycarboxy acids having 8 carbon atoms or less, and especially dicarboxy acids of this size.

Esterification procedure is conventional. A small proportion of an acidic catalyst is usually present, such as hydrogen chloride, p-toluene sulfonic acid, concentrated sulfuric acid, or the like. In the present case, the polycarboxy acid reactants are generally sufficiently acidic to make addition of any acidic catalyst unnecessary.

The oxyalkylated resin reactants employed to produce my ester compounds usually contain an alkaline catalyst, added prior to oxyalkylation. Such alkaline catalyst is usually a strong alkali like sodium hydroxide. It will therefore consume part of any polycarboxy acid employed if it is not first neutralized or removed. It is therefore desirable to separate such basic catalyst from the oxyalkylated resin reactant prior to use in esterification, for example, by allowing it to settle for a period of time. It may be carefully neutralized by means of a strong mineral acid like hydrochloric or, preferably, dilute sulfuric acid, and the alkali salt thereafter removed from the oxyalkylated resin by sedimentation, filtration, centrifuging, or, in some cases, washing with a limited proportion of water.

Any water remaining in the oxyalkylated resin reactant from such processing should be removed substantially completely before esterification is undertaken. Distillation with a volatile solvent like xylene will accomplish this. Distillation under the vacuum produced by a steam ejector will also remove such water.

If the proportion of basic catalyst in this reactant is small, it may be most desirable simply to add enough polycarboxy acid to neutralize such base, and then allow the salt so formed (commonly the acid salt of the polycarboxy acid) to separate by sedimentation or filtration.

The oxyalkylated resin is commonly produced in the presence of inert solvent, such as xylene; and this is desirably retained in the reactant during such purification and later in the esterification step. Further thinning of the resinous reactant with such solvent may therefore be employed to accelerate separation of the undesirable basic catalyst either as such or as a salt, as described above.

To produce my esters, I simply mix my oxyalkylated resin reactant in undiluted or, preferably, in diluted form with a polycarboxy acid reactant, in the presence of an acidic catalyst if desired or required, but commonly in absence of such added catalyst. I then reflux and distill until esterification is complete as indicated by the drop in free carboxyl content or, in some cases, simply by noting the point at which no more water of esterification distills. When the polycarboxy acid reactant is used in the form of an anhydride, no water will be eliminated in the esterfication of the first carboxyl. However, in cases where the free acids, like diglycolic acid, are used, water will be eliminated. All such procedures are conventional; and it is sufficient to state that I esterify by conventional procedures, long described in the literature.

In all instances, it is my general purpose to produce esters containing free carboxyl groups. It is preferable that enough polycarboxy acid be used so that all reactive hydroxyl groups are converted into acidic fractional ester form. In such esters, one or more free carboxyl groups remain, for every hydroxyl group so esterified, depending on whether the acid employed is dicarboxy or of higher functionality.

The amount of polycarboxy acid used may be determined from the hydroxyl number of the oxyalkylated resin employed, in the usual calculation. In general, I prefer to use slightly more than this theoretical proportion of acid, for a number of reasons.

As molecular weight of the oxyalkylated resin increases, it is more difficult to bring the esterification reaction to conclusion unless an excess of one reactant is present.

Use of an appreciable deficiency of acid may in a few instances result in cross-linking and the formation of relatively insoluble complete esters.

Presence of the alkaline catalyst remaining from the oxyalkylation reaction means that some of the acid will be consumed in reacting with such catalyst. Usually the catalyst proportion is small; but it nonetheless consumes some of the acid added.

The oxyalkylation mass is, of course, not a single pure chemical entity. Rather, it is a co-generic mixture of closely related oxyalkylated resin molecules, all as is common knowledge. It may contain minor proportions of byproducts such as ring polymers of the alkylene oxides used, or minor proportions of glycols arising from the traces of water present. Such constituents consume polycarboxy acid, just as do the oxyalkylated resin molecules.

There is no harm in increasing the excess of polycarboxy acid employed except where cost of the excess becomes material or the excess or uncombined polycarboxy acid separates or crystallizes from the product. I have used as much as several times the theoretical amount of acid without producing an undesirable product.

Specifically, where my oxyalkylated resin reactant is prepared by introducing into a conventional amylphenol-formaldehyde resin 88 moles of propylene oxide and then 15 mols of ethylene oxide, per phenolic nucleus, I prefer to employ 10% by weight of diglycolic acid, based on the weight of such oxyalkylated resin.

I prefer to follow the progress of the esterification reaction by determining the acid number of the starting mixture of oxyalkylated resin reactant and polycarboxy acid reactant; and then at intervals as esterfication proceeds. Where a theoretical proportion of polycarboxy acid is used, the esterification is of course carried till the acid number has fallen to one-half its original value. If esterification is stopped much short of this point, more free or unesterified polycarboxy acid is present, which is wasteful.

For reasons which are not clear to me, it is generally possible to react appreciably-larger-than-theoretical proportions of polycarboxy acids with my oxyalkylated resin reactants, without detectable ill effects. In general, I prefer to employ an excess of from 10% to 50%; and I have successfully used my polycarboxy acids in amounts several times greater than theoretical. This is particularly true as to diglycolic acid.

The solvent present in the esterified mass may be removed by distillation or other conventional means; or for many purposes, such as in demulsification, the ester may acceptably be employed in the presence of such solvent. This point is immaterial to my invention.

The following examples illustrate the esterification step.

*Example 1c*

Introduce 1,000 parts by weight of the oxypropylated amylphenol-formaldehyde resin of Example 1b above (which contains a negligible proportion of xylene) into a reflux-distillation apparatus, along with 100 parts by weight of diglycolic acid. Heat the mixture at 225° C., with stirring, collecting the water which distills, and returning to the reaction vessel any xylene which distills. When no more water distills, the esterification is complete. The reaction mass includes a small proportion of crystalline salt, probably sodium acid diglycolate, which may be separated by allowing the reaction product to stand quiescent for a period of time. Dilution with any suitable solvent, like xylene, accelerates such separation. The product is an acidic fractional ester of the oxyalkylated resin and the diglycolic acid.

*Example 2c*

I have repeated Example 1c above, substituting, for the oxypropylated resin of Example 1b, the oxypropylated resins of Examples 2b to 9b, and the oxypropylated-and-oxyethylated resins of Examples 10b to 15b, respectively. In each instance I have used 100 parts by weight of diglycolic acid, and 1,000 parts by weight of oxyalkylated resin.

*Example 3c*

I have repeated Examples 1c and 2c above, using in each instance only 80 parts by weight of diglycolic acid, instead of the 100 parts by weight, used in each of said examples.

*Example 4c*

I have repeated Examples 1c and 2c above, using in each instance 110 parts by weight of phthalic anhydride, instead of the 100 parts by weight of diglycolic acid, used in each of said examples.

*Example 5c*

I have repeated Examples 1c and 2c above, using in each instance 65 parts by weight of maleic anhydride, instead of the 100 parts by weight of diglycolic acid, used in each of said examples.

*Example 6c*

I have repeated Examples 1c and 2c above, using in each instance 100 parts by weight of adipic acid, instead of the 100 parts by weight of diglycolic acid, used in each of said examples.

*Example 7c*

I have repeated Examples 1c and 2c above, using in each instance 135 parts by weight of sebacic acid, instead of the 100 parts by weight of diglycolic acid, used in each of said examples.

*Example 8c*

I have repeated Examples 1c and 2c above, using in each instance 165 parts by weight of bromophthalic acid, instead of the 100 parts by weight of diglycolic acid, used in each of said examples.

*Example 9c*

I have repeated Examples 1c and 2c above, using in each instance 205 parts by weight of tetrachlorophthalic acid, instead of the 100 parts by weight of diglycolic acid, used in each of said examples.

*Example 10c*

I have repeated Examples 1c and 2c above, using in each instance 380 parts by weight of the dimerized soybean fatty acids of "Aminoester Example 1" of U. S. Patent No. 2,429,998, to DeGroote, dated November 4, 1947, instead of the 100 parts by weight of diglycolic acid, used in each of said examples.

The reactant amounts recited in the foregoing examples are expressed as "parts," for the reason stated above, i. e., that I have worked with quantities ranging from grams to thousands of pounds in conducting these operations.

I have used my polycarboxy acid reactants in different proportions, based on the weight of oxyalkylated resin used. For example, in addition to using 10% or 8% of diglycolic acid, as in Examples 1c and 2c, respectively, I have used this acid with various of my oxyalkylated resins in amounts ranging from less than 5% to more than 15% by weight of such oxyalkylated resins. In general I prefer to employ a proportion of diglycolic acid representing from about 5% to about 15% the weight of oxyalkylated resin used. I have usually and desirably based the amount of the other polycarboxy acids I have used on the amount of diglycolic acid I have used in preparing analogous products and on the respective molecular weights of the polycarboxy acid reactants. The foregoing Examples 4c to 10c inclusive illustrate this, in that all of them employ polycarboxy acids other than diglycolic acid; but all are used in proportions equivalent to 10% by weight of diglycolic acid. Obviously, the proportion of such other acids which would be equivalent to 5% by weight of diglycolic acid would be half the amount shown in each of said Examples 4c to 10c, etc.

My preferred ester product is made from an amylphenol-formaldehyde resin, into which 88 mols of propylene oxide have been introduced, and into which, thereafter, 15 mols of ethylene oxide have been introduced, per phenolic nucleus; and the resulting oxyalkylated product is then esterified with 10% its weight of diglycolic acid, all as described above.

The above-described esterification step is not inconsequential; and my acidic fractional esters are not the equivalents of the unesterified oxyalkylated resin reactants from which they were produced. This is shown clearly by experiments involving the demulsification of crude petroleum oil. Demulsifiers which are similar in all respects except that one contains a certain proportion of one of my ester products whereas a second contains the same proportion of the unesterified oxyalkylated resin from which said ester product was produced do not exhibit identical demulsifying powers. The esterification step has introduced some obscure activating effect into the oxyalkylated resin, which is easily demonstratable although not explicable.

While a large number of polycarboxy acids are suitable for producing my ester products, I prefer to employ either diglycolic acid, phthalic acid or anhydride, maleic acid or anhydride, adipic acid, or sebacic acid for this purpose.

PART 4.—DEMULSIFICATION PROCESS

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000 or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing the present process the treating or demulsifying agent is employed in the conventional manner, well known to the art, described for example in Patent 2,626,929, dated January 27, 1953, Part 3, and reference is made thereto for a description of conventional procedures of demulsifying, including batch, continuous and down-the-hole demulsification, the process essentially involving introducing a small amount of demulsifier into a large amount of emulsion with adequate admixture, with or without the application of heat, and allowing the mixture to stratify.

In many instances the oxyalkylated products herein specified as demulsifiers can be conveniently used without dilution. However, they may be diluted as desired with any suitable solvent. For instance, by mixing 75 parts by weight of an oxyalkylated derivative, for example, the product of Example 1c with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

The products herein described may be used not only in diluted form, but also may be used admixed with some other chemical demulsifier. A mixture which illustrates such combination is the following:

Oxyalkylated derivative, for example, the product of Example 1c, 20%;
A cyclohexylamine salt of a polypropylated naphthalene monosulfonic acid, 24%;
An ammonium salt of a polypropylated napthalene monosulfonic acid, 24%;
A sodium salt of oil-soluble mahogany petroleum sulfonic acid, 12%;
A high-boiling aromatic petroleum solvent, 15%;
Isopropyl alcohol, 5%.

The above proportions are all weight percents.

The products herein described may be used as demulsifiers not only in the form in which they are produced or in diluted form, but they may also be so used in admixture with other and compatible chemical demulsifiers.

I claim:

1. The process of breaking petroleum emulsions of the water-in-oil type characterized by subjecting the emulsion to the action of a demulsifying agent including acidic fractional esters containing free carboxyl groups, in which esters (A) the acyl radical is that of a polycarboxy acid; and (B) the alcoholic radical is that of certain hydrophile polyhydric synthetic oxyalkylation products of (a) an alpha-beta alkylene oxide having not more than 4 carbon atoms and selected from the class consisting of ethylene oxide, propylene oxide, butylene oxide, glycid, and methylglycid; and (b) an oxyalkylation-susceptible, fusible, organic-solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of phenols of functionality greater than two; said phenol being of the formula

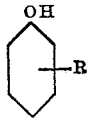

in which R is a hydrocarbon radical having at least 4 and not more than 14 carbon atoms and substituted in the 2,4,6-position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is of sufficient magnitude that at least 40 and not more than 120 occurrences of the oxypropylene radical, —$C_3H_6O$—, are present for each phenolic nucleus.

2. The process as in claim 1 in which the acyl radical is that of a dicarboxy acid.

3. The process as in claim 1 in which the acyl radical is that of a dicarboxy acid containing not more than 8 carbon atoms.

4. The process as in claim 3 in which the phenol-aldehyde resin is acid-catalyzed.

5. The process as in claim 4 in which the oxyalkylated resin contains in addition to the specified oxypropylene radicals, a plurality of divalent radicals selected from the class consisting of oxyethylene radicals, oxybutylene radicals, hydroxy oxypropylene radicals, and hydroxy oxybutylene radicals for each phenolic nucleus.

6. The process as in claim 4 in which the oxyalkylene resin contains in addition to the specified oxypropylene radicals, a plurality of oxyethylene radicals for each phenolic nucleus.

7. The process as in claim 6 in which the oxyalkylated resin contains at least 80 oxypropylene radicals for each phenolic nucleus.

8. The process as in claim 7 in which the oxyalkylated resin contains at least 5 and not more than 20 oxyethylene radicals for each phenolic nucleus.

9. The process as in claim 8 in which the oxyethylene radicals are located in the polyoxyalkylene chain at a point more distant from the phenolic nucleus than are the oxypropylene radicals.

10. The process as in claim 9 in which the dicarboxy acid is diglycolic acid.

11. The process as in claim 10 in which the amount of diglycolic acid employed is from 5 to 15% the weight of oxyalkylated resin employed.

12. The process as in claim 10 in which the diglycolic acid employed is approximately 10% the weight of the oxyalkylated resin.

13. The process as in claim 9 in which the dicarboxy acid employed is phthalic acid.

14. The process as in claim 9 in which the dicarboxy acid employed is maleic acid.

15. The process as in claim 9 in which the dicarboxy acid employed is adipic acid.

16. The process as in claim 9 in which the dicarboxy acid employed is sebacic acid.

References Cited in the file of this patent

UNITED STATES PATENTS

| | | |
|---|---|---|
| 2,406,339 | Badertscher et al. | Aug. 27, 1946 |
| 2,454,544 | Bock et al. | Nov. 23, 1948 |
| 2,500,349 | DeGroote et al. | Mar. 14, 1950 |
| 2,570,611 | Towne | Oct. 9, 1951 |